United States Patent [19]
Nguyen et al.

[11] Patent Number: 5,845,112
[45] Date of Patent: Dec. 1, 1998

[54] METHOD FOR PERFORMING DEAD-ZONE QUANTIZATION IN A SINGLE PROCESSOR INSTRUCTION

[75] Inventors: Le Trong Nguyen, Monte Sereno; Heonchul Park, Cupertino; Cliff Reader, Saratoga; Yoon Lee, San Jose, all of Calif.

[73] Assignee: Samsung Electronics Co., Ltd., Seoul, Rep. of Korea

[21] Appl. No.: 812,774

[22] Filed: Mar. 6, 1997

[51] Int. Cl.⁶ ..................................................... G06F 9/302
[52] U.S. Cl. ...................................... 395/562; 364/725.03
[58] Field of Search ....................... 364/725.03; 395/562, 395/563

[56] References Cited

U.S. PATENT DOCUMENTS 5,345,408  9/1994  Hoogenboom .................... 364/725.03

OTHER PUBLICATIONS

Madisetti et al., *DCT/IDCT Processor Design for HDTV Applications*, IEEE 1995, pp. 63–66.
Lee et al., *Architecture Design of MPEG–2 Decoder System*, IEEE 1995, pp. 258–259.
Zhou, Minli, *Vector–radix IDCT Implementation for MPEG decoding*, IEEE 1995, pp. 75–78.
Bhaskaran et al., *Algorithmic and Architectural Enhancements for Real–Time MPEG–1 Decoding on a General Purpose RISC Workstation*, IEEE Transactions on Circuits and Systems for Video Technology, Oct. 1995, pp. 380–386.
Neogi et al., *Embedded Parallel Divide–and–Conquer Video Decompression Algorithm and Architecture for HDTV Applications*, IEEE Transactions on Consumer Electronics, vol. 41, No. 1, Feb. 1995, pp. 160–171.
Araki et al., *Video DSP Architecture for MPEG2 CODEC*, IEEE 1994, pp. II–417 to II–420.
Ramaswamy et al., *Efficient Implementation of the Two Dimensional Discrete Cosine Transform for Image Coding applications on the DSP96002 Processor*, IEEE 1993, pp. 96–99.
Fandrianto et al., *A Programmable Solution for Standard Video Compression*, IEEE 1992, pp. 47–50.

*Primary Examiner*—Richard L. Ellis
*Attorney, Agent, or Firm*—Skjerven, Morrill, MacPherson, Franklin & Friel; David T. Millers

[57] ABSTRACT

An extension to existent vector instruction sets is presented in a form of new vector instructions which perform operations specialized for efficient digital video compression and decompression. A processor is designed to implement the arithmetic operation of each of these instructions in a single clock cycle, and some of the present instructions perform arithmetic operations selectively and directly on elements of the same registers.

10 Claims, 3 Drawing Sheets

5,845,112

METHOD FOR PERFORMING DEAD-ZONE QUANTIZATION IN A SINGLE PROCESSOR INSTRUCTION

BACKGROUND OF THE INVENTION

1. Field of the Invention

This invention relates to processor architectures and particularly to architectures for processing digital video.

2. Description of Related Art

Computer system architecture for digital video compression and decompression are well known; see, e.g., U.S. Pat. Nos. 5,585,863 to Hackett, Brown and Charneski and 5,568,192 to Hannah, all herein incorporated by reference.

Image data for digital video images are often compressed to reduce the storage space or channel bandwidth required for processing the video images. The compressed data, however, cannot be directly displayed without decompressing. Motion Picture Expert Group (MPEG) is an international committee charged with providing a standard for achieving compatibility between image compression and decompression equipment. Since its inception, two standards have been proposed by MPEG, referred hereinbelow as "MPEG-1" and "MPEG-2". Each of these standards specifies both the coded (i.e., compressed) digital representation of video signal for the storage media, and the process for decoding (i.e., decompressing) coded information. (From now on, the terms "encoding" and "compression" will be used interchangeably, and so will the terms "decoding" and "decompression".)

MPEG-1 or MPEG-2 encoding of image data saves storage space for video data but is computationally intensive. Several processing steps are involved in encoding, one of which, for example, is two-dimensional discrete cosine transform (2-D DCT), which performs multiple matrix multiplications. As mentioned before, encoded video data has to be decoded before being displayed. The decoding is also computationally intensive, as it involves reversing the compression steps, including reversing the 2-D DCT, which is called 2-D IDCT (inverse discrete cosine transform), or merely IDCT. For video compression and decompression, a large amount of image data, i.e., the many pixel values must be manipulated, using repetitive operations where many data elements, i.e., pixel values, are manipulated by the same operation.

An SIMD (single instruction multiple data) computer architecture, where many data elements are processed in response to a single instruction, is well suited for video processing. SIMD computer systems provide vector and array instructions, i.e., extended versions of the basic scalar instructions, to handle such group of data elements efficiently. However, it is further desired that the number of instructions that must be executed to manipulate a group of data elements and the time required for such manipulation should be minimized. A processor architecture implementing an instruction set that efficiently performs video processing is desired.

SUMMARY

In accordance with this invention, an SIMD processor implements novel vector instructions for video data manipulation. Each of these instructions performs an operation which requires execution of multiple instructions in prior processors. In addition, the arithmetic operation for each of these instructions is carried out in one clock cycle by the hardware. This is accomplished by using specialized hardware and parallel processing to shorten the execution time.

BRIEF DESCRIPTION OF THE DRAWINGS

FIG. 1(*b*) conceptually depicts the implementation of the VAAS3 instruction for two stage addition.

DETAILED DESCRIPTION

A processor in accordance with an embodiment of the invention implements processor instructions where each processor instruction performs an arithmetic operation often required for video processing but not implemented as a single instruction by prior processors.

Sections A.1 to A.8 at the end of the Detailed Description describe an exemplary syntax for eight instructions out of the 12 new instructions disclosed in accordance with the invention. The 12 new instructions respectively carry out, in one clock cycle, arithmetic operations frequently used in MPEG compression and decompression. The exemplary syntax of these vector instructions is only illustrative and should not be interpreted as to be limiting.

The following 12 vector instructions demonstrate either or both of two of the present invention's innovative aspects: the capabilities to (1) perform arithmetic operations selectively and directly on elements of the same vector register, and (2) execute each of the presented instructions in a single clock cycle.

VAAS3 ("Add and Add Sign of (−1, 0, 1)") instruction, which computes the sum of three numbers, A, B and extsgn3(A), either for a pair of scalar values (A and B) or two vectors of the same size. In the latter case, two elements of the two vectors with the same index are pair-wise added. For example, if the two vectors VRa and VRb having N elements, VRa[0] to VRa[N−1], and VRb[0] to VRb[N−1], are added, elements VRa[i] and VRb[i] are added for each index i ranging from 0 to N−1. The function extsgn3(A) returns −1 if its argument, A in this example, is negative, 0 if A is zero, and 1 if A is positive.

Instructions VAAS3 and VASS3 include extsgn3 in computing the sum, and they can be used for a quantization method used in the video compression process, called "dead-zone quantization", where the quantum around the zero value is defined to be as twice as wide (i.e., a width of two from −1 to +1) as the rest of the other quanta, each of which has the width of one. The dead-zone quantization is effective in filtering out noise signals due to the high probability of noise signals occurring near the zero value, that is, in the [−1, +1] region.

Figure 1A:
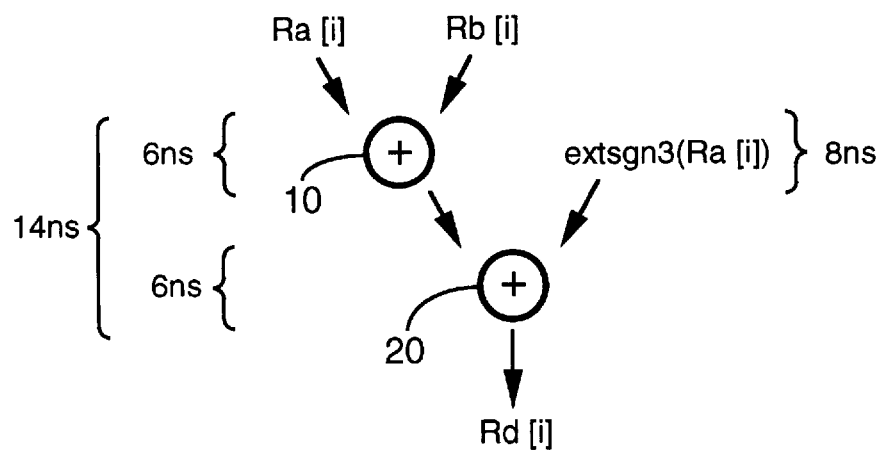
FIG. 1(*a*) conceptually depicts the prior art implementation of two stage addition.
Figure 1B:
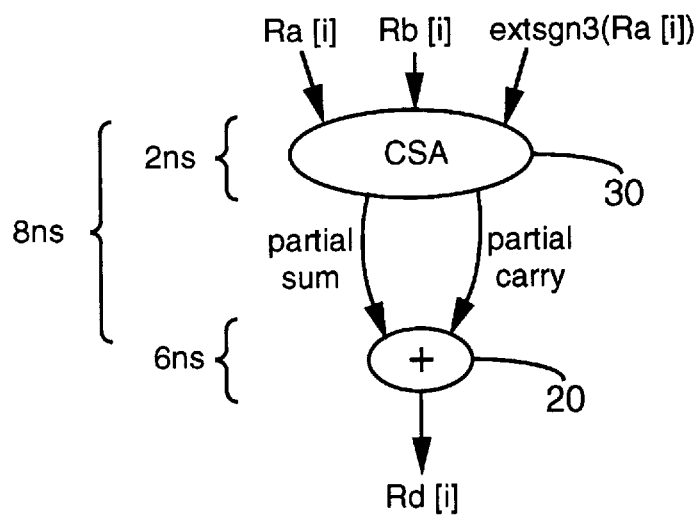

In general, addition of three numbers is done in two stages by first adding two numbers and then adding the third number to the sum of the first two, which takes two clock cycles to execute. FIG. 1(a) depicts two-stage addition done in prior art. In the traditional way, the first addition 10 and the second addition 20 each take one clock cycle, taking two clock cycles for the overall execution. The present implementation of the VAAS3 instruction, conceptually depicted in FIG. 1(b), completes execution of this three-number addition in a single clock cycle, say, 8 ns (nanoseconds), by using a 3:2 ("three-to-two") "compressor" 30 which adds all three numbers simultaneously using a specialized circuitry, called Carry Save Adder or CSA, with a very short gate delay, say, 2 ns, and then adding the two results, the partial sum and the partial carry, in a conventional manner 20 in, say, 6 ns. FIG. 1(b) shows the CSA 30 with three inputs (Ra[i], Rb[i] and extsgn3(Ra[i])), and two outputs (a partial sum and a partial carry).

Section A.1 illustrates a possible syntax for the VAAS3 instruction.

In Sections A.1 to A.8, "Assembler Syntax" specifies what combination of operands an instruction can assume. For example, the second syntax VAAS3—VRd, VRa, SRb denotes that the VAAS3 instruction can operate on (the contents of) vector register VRa and scalar register SRb, and store the result in vector register VRd.

"Description" describes the operation the instruction carries out. The description is more formally specified in "Operation" part in well-known C computer programming language. The illustrated code states that: "For index i's value ranging from 0 to NumElem−1 (where NumElem is the number of elements), for the elements whose element mask EMASK[i]=1, perform Rd[i]=Ra[i]+Rb[i]+extsgn3 (Ra[i]), where the value of extsgn3(Ra[i]) equals 1 if Ra[i] is positive, 0 if Ra[i] is zero, and −1 if Ra[i] is negative."

Note that when at least one of instruction VAAS3's two operands is a vector register, e.g., with N data elements, the three-number addition described above is executed N times simultaneously. Even though the "Operation" part of the instruction specification uses a "for" loop, which is usually carried out serially, these N additions are executed in parallel by an SIMD processor, also known as a vector processor. In one embodiment, a vector processor is employed as a co-processor to a main processor, which performs scalar arithmetic instructions and controls the vector processor. This parallelism also applies to the rest of the instructions described later.

The inventive aspects of the presented 12 instructions, however, is not limited to such main processor and co-processor dual configuration. The present invention can be used in a situation where a vector processor is the sole, main processor. Nor is the invention limited to an SIMD computer architecture. The inventive aspects are also applicable to conventional SISD (single instruction single data) architectures and also to MIMD (multiple instruction multiple data) architectures, the latter due to the fact that an MIMD computer can be seen as multiple SIMD computers put together.

The VAAS3 instruction is used for dequantization, during digital video decompression. A use of the VAAS3 instruction is illustrated by the fourth line of the code below which is a part of IDCT (inverse discrete cosine transform) procedure, a step of dequantization. The arithmetic operation "(2*dct_zz[i])+Sign(dct_zz[i])", is a special case of instruction VAAS3 where vector registers VRa and VRb, i.e., the source operands, assume the same value, dct_zz. Using the VAAS3 instruction, this frequently occurring MPEG arithmetic operation is implemented as a single instruction.

```
for (m=0;m<8;m++) {
    for (n=0;n<++) {
        i = scan[m] [n]
        dct_recon[m] [n] = (((2*dct_zz[i])+Sign(dct_zz[i]))*
            quantizer_scale* non_intra_quant [m] [n]) /16
        if ((dct_recon[m] [n] &1) == 0)
            dct_recon [m] [n] = dct_recon [m] [n] -
sign (dct_recon [m] [n]);
        if(dct_recon[m] [n]>2047)dct_recon[m] [n] = 2047;
        if(dct_recon[m] [n]<-2048) dct_recon[m] [n] = -2048;
        if(dct_zz[i] == 0)
            dct_recon[m] [n] = 0;
    }
}
```

Section A.2 describes a VASS3 ("Add and Subtract Sign of (−1, 0, 1)") instruction. The VASS3 instruction carries out the same function as the VAAS3 instruction except that value extsgn3 is subtracted from the sum of the first two numbers instead of being added to the sum. That is, instead of performing Rd[i]=Ra[i]+Rb[i]+extsgn3(Ra[i]), Rd[i]=Ra[i]+Rb[i]−extsgn3(Ra[i]) is performed, where the index i ranges from 0 to N−1, N is the size of vector registers Ra, Rb and Rd, and extsgn3(Ra[i]) is defined as in the VAAS3 instruction. Note that subtracting a value Y from a value X is equivalent to adding −Y to X. Therefore, the implementation of the VASS3 instruction is carried out in a manner similar to that of the VAAS3 instruction depicted in FIG. 1(b).

Note that instructions VAAS3 and VASS3 can take two scalars, two vectors, or one scalar and one vector as their source operands. When two scalars are the source operands, the designated operation is carried out only once instead of over multiple pairs of data elements as in the case of at least one source operand being a vector.

Figure 2:
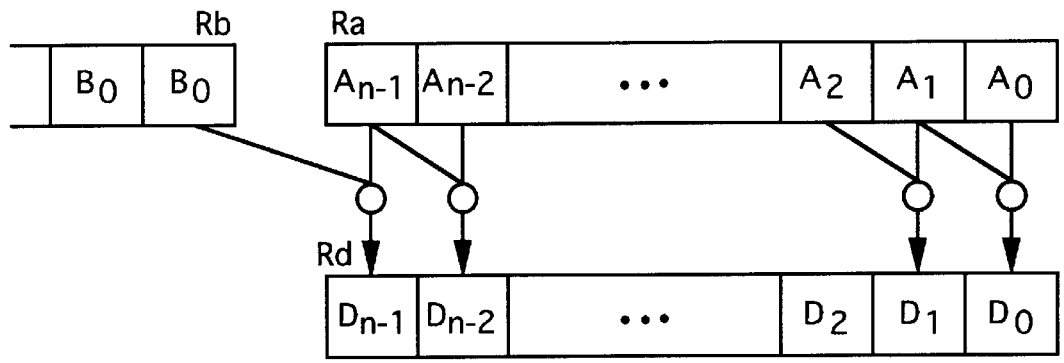
FIG. 2 conceptually depicts the operations of VADDH ("Add Two Adjacent Elements") and VAVGH ("Average Two Adjacent Elements") instructions.

Section A.3 describes a VADDH ("Add Horizontally") instruction. This instruction takes one N-element vector register, VRa, as source operand and sums each successive pair of elements, Ra[i] and Ra[i+1], for each index i ranging from 0 to N−1, and stores the results in a destination vector VRd. As shown in FIG. 2, the last element Ra[n−1] (denoted as $A_{n-1}$) does not have a next element to be paired with. Thus, the first element of vector register VRb or scalar register SRb is added to data element Ra[n−1].

Section A.4 describes a VADDQ ("Add Quad") instruction. This instruction performs an operation similar to VADDH but VADDQ takes two vectors, VRa and VRb, as source operands instead of one. Two elements each from the two N-element source operands, VRa[i], VRa[i+1], VRb[i] and VRb[i+1], for each value of index i ranging from 0 to N−1, are summed. The results are stored in a destination vector register VRd. Note that the N-th quadruple sum ($D_{n-1}$) is not computed as depicted in the FIG. 4.

Section A.5 describes a VAVGH ("Average Horizontally") instruction. The VAVGH instruction is very similar to the VADDH instruction. The way successive pairs of elements are selected is the same, which is shown in FIG. 2. The only difference is that VAVGH computes the arithmetic average of the two numbers after their sum is computed. This instruction takes one N-element vector register, VRa, as source operand and averages each successive pair of elements, Ra[i] and Ra[i+1], for each index i ranging from 0 to N−1, and stores the results in a destination vector VRd. As shown in FIG. 2, the last element Ra[n−1] (denoted as $A_{n-1}$) is not paired with a next element in operand VRa. Thus, the first element of a vector register VRb or a scalar register SRb is averaged with the last element VRa[N−1] as in the case of instruction VADDH.

Obtaining an average of two numbers is a two-stage operation. First the two numbers are added together, and then the sum is divided by two. To carry out the VAVGH instruction in one clock cycle, the addition is done by an ordinary adder, but division is done by a fast shifter so that adding and shifting together are executed within one clock cycle.

Figure 4:
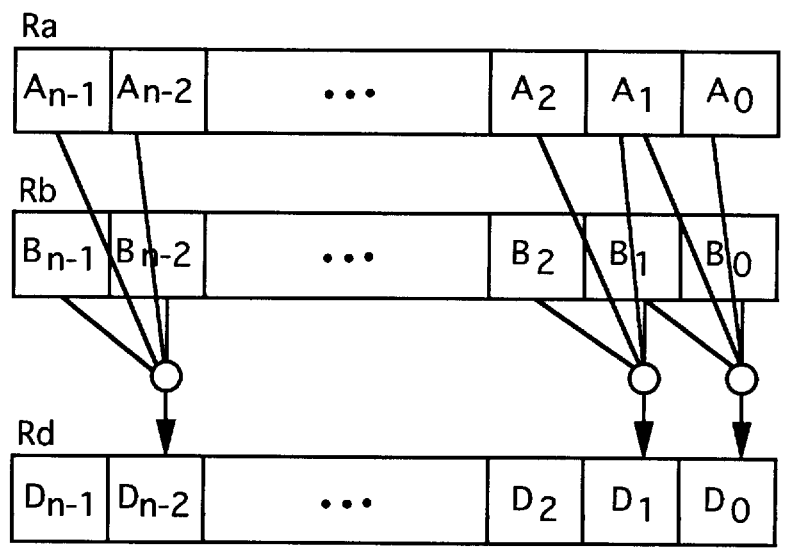
FIG. 4 conceptually depicts the operations of VADDQ ("Add Four Adjacent Elements") and VAVGQ ("Average Four Adjacent Elements") instructions.

Section A.6 describes a VAVGQ ("Average Quad") instruction. The VAVGQ instruction is very similar to the VADDQ instruction. The successive quadruples of elements are selected as shown in FIG. 4. This instruction performs an operation similar to VAVGH but VAVGQ takes two vectors as source operands instead of one vector. Two elements each from the two N-element source operands, VRa[i], VRa[i+1], VRb[i] and VRb[i+1], for each value of index i ranging from 0 to N−1, are taken, summed, and then divided by four. The results are stored in a destination vector register VRd. Note that the N-th quadruple average ($D_{n-1}$) is not computed as shown in FIG. 4.

In general, obtaining an average of four numbers, say, A, B, C, D, is a three-stage operation. First, A and B, and C and D are pair-wise added. Second, the two sums are added. Lastly, the total of the four numbers are divided by four, which is realized by right-shifting the total by two bit positions. In one embodiment the second addition and the shifting are respectively executed by special hardware so that the total execution time falls within one clock cycle.

The VAVGH and the VAVGQ instructions perform intra-register element arithmetic. That is, rather than taking each operand from a different register, these instructions operate on elements that belong to a same register. For example, the VAVGH instruction operates on a pair of elements belonging to the same vector register VRa. The VAVGQ also operates on a pair of elements belonging to one vector register and another pair belonging to another vector register.

The excerpt from an MPEG decompression code shown below illustrates uses of the VAVGH and the VAVGQ instructions. For example, the VAVGH instruction can be used to compute "(pel_past[i+down_for][j+right_for]+ pelpast[i+down_for+1][j+right_for])/2" in one clock cycle. Similarly, in the bottom two lines, the VAVGQ instruction can be used.

```
if((!right_half_for) && (!down_half_for))
    pel[i][j]=pel_past[i+down_for][j+right_for];
if((!right_half_for) && down_half_for))
    pel[i][j]=(pel_past[i+down_for][j+right_for];
    + pel_past[i+down_for+1][j+right_for])//2;
if(right_half_for && (!down_half_for))
    pel[i][j]=(pel_past[i+down_for][j+right_for] +
        pel_past[i+down_for][j+right_for+1])//2;
if(right_half_for && down_half_for)
    pel[i][j] = (pel_past[i+down_for][j+right_for]
    + pel_past[i+down_for+1][j+right_for] +
    pel_past[i+down_for][j+right_for+1] +
    pel_past[i+down_for+1][j+right_for+1])//4;
```

Figure 3:
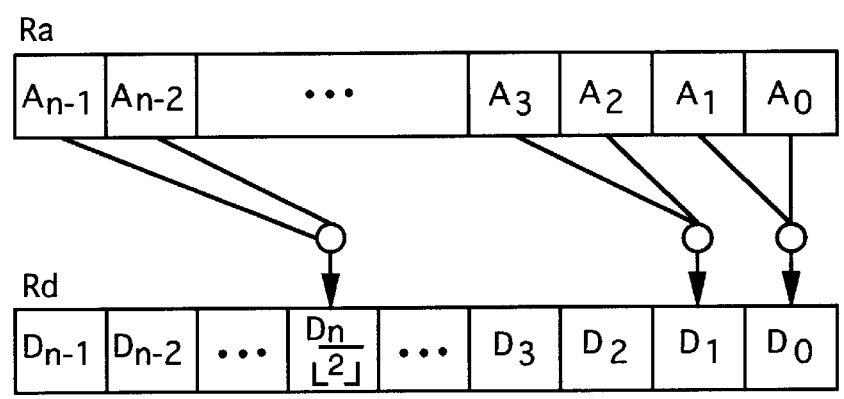
FIG. 3 conceptually depicts the operations of VADD2 ("Add Two Adjacent Elements without Overlap") and VAVGH2 ("Average Two Adjacent Elements without Overlap") instructions.
Figure 5:
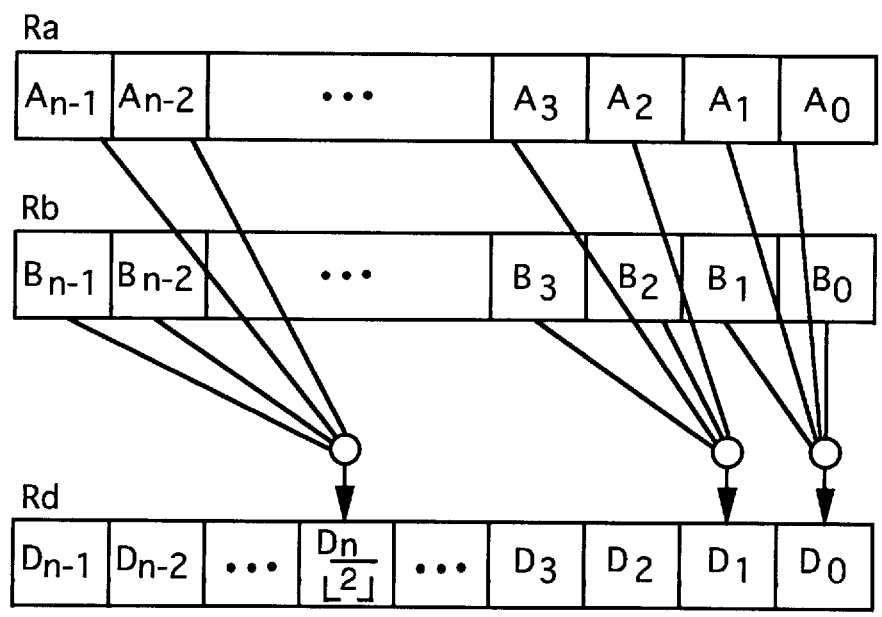
FIG. 5 conceptually depicts the operations of VADDQ2 ("Add Four Adjacent Elements without Overlap") and VAVGQ2 ("Average Four Adjacent Elements without Overlap") instructions.

Although not illustrated in Sections A.1 to A.8, present invention includes four variations of the above-described instructions, one each for instructions VADDH, VADDQ, VAVGH and VAVGQ. These variations are named VADDH2, VADDQ2, VAVGH2 and VAVGQ2, respectively. These four instructions are similar to their original versions. The only difference lies in the way data elements are selected to be either summed or averaged. In the original versions, each successive pair or quadruple was selected for each consecutive value of index i. This resulted in virtually every data element of source operand vectors being summed or averaged twice. In the varied versions, each instruction's designated operation is carried out only over even values of index i, e.g., 0, 2, 4 and so on, so that each data element of source operand vectors is summed or averaged only once. The varied fashion of data element selection is illustrated in FIGS. 3 and 5. FIG. 3 shows how VADDH2 and VAVGH2 choose data elements from a single source operand, and FIG. 5 shows how VADDQ2 and VAVGQ2 choose data elements from a two source operands. In both FIGS. 3 and 5, the result of operating on the last pair $A_{n-1}$ and $B_{n-1}$ or the last quadruple $A_{n-1}$, $A_{n-2}$, $B_{n-1}$ and $B_{n-2}$ is stored in the k-th element of the destination register Rd, where k is floor(N/2), i.e., the largest integer smaller than or equal to N/2, N being the number of elements each in vector registers Ra, Rb and Rd. That is, with these "non-overlapping" instructions, only about half of the destination data elements are needed, i.e., floor(N/2) data elements. These instructions are useful for video decimation processes that reduce the size of video images.

Section A.7 describes a VEXTSGN2 ("Extract Sign of (−1, 1)") instruction. This instruction takes one source operand, which may be a vector register or a scalar register, "extracts" the sign value of each element of the source register, and stores the extracted sign values in the corresponding positions of a destination register. A sign value of an element is defined as −1 if the element is negative, 1 if the element is zero or positive.

Section A.8 describes a VEXTSGN3 ("Extract Sign of (−1, 0, 1)") instruction, which implements a similar operation as VEXTSGN2. The only difference is that, when an element has a zero value, the sign value is 0.

The VEXTSGN2 and VEXTSGN3 instructions each can take a scalar source operand, in which case the designated operation is performed only once as if a vector with only one element is taken as a source operand. The VEXTSGN2 and VEXTSGN3 instructions perform respective arithmetic operations in a single clock cycle. Before the invention, this type of operation typically took multiple instructions and four clock cycles. Following is a program in pseudo-assembly language that represents a traditional way to perform a "three-pronged" branching serially in four clock cycles.

```
        Compare and Branch to label L1 on negative A
        Compare and Branch to label L2 on zero A
        S <-- 1
        Branch to DONE
L1:     S <-- −1
        Branch to DONE
L2:     S <-- 0
DONE:   . . .
```

The two comparisons take two clock cycles, one of the assignment to variable S, which is the sign value, takes one clock cycle, and the "wrap-up" routine starting at label DONE takes another cycle. This procedure totals four clock cycles. The VEXTSGN3 instruction not only integrates the above procedure which takes multiple instructions and multiple clock cycles into a single instruction, it is implemented in a special circuitry to be performed within one clock cycle. The VEXTSGN2 instruction works similarly to the VEXTSGN3 instruction.

Note that hardware and the method for performing the arithmetic operation for instruction VEXTSGN3 can be used in the VAAS3 and VASS3 instructions.

This appendix provides an exemplary specification, including an exemplary syntax, for instructions in accordance with an embodiment of the invention. In the following, Ra and Rb indicate registers for source operands. Rd indicates a register for a destination operand. VR and SR represent vector registers and scalar registers, respectively.

Section A.1 VAAS3: Add and Add Sign of (−1, 0, 1)

Assembler Syntax
VAAS3—VRd, VRa, vRb
VAAS3—VRd, VRa, SRb
VAAS3—SRd, SRa, SRb

Description

The content of vector/scalar register Ra is added to Rb to produce an intermediate result, the intermediate result is then added with the sign of Ra; and the final result is stored in vector/scalar register Rd.

Operation

```
for (i = 0; i < NumElem && EMASK[i]; i++) {
    if (Ra[i] > 0)        extsgn3 = 1;
    else if (Ra[i] < 0)   extsgn3 = −1;
    else                  extsgn3 = 0;
    Rd[i] = Ra[i] + Rb[i] + extsgn3; }
```

Section A.2 VASS3: Add and Subtract Sign of (−1, 0, 1)

Assembler Syntax
VASS3—VRd, VRa, VRb
VASS3—VRd, VRa, SRb
VASS3—SRd, SRa, SRb

Description

The content of vector/scalar register Ra is added to Rb to produce an intermediate result, the sign of Ra is then subtracted from the intermediate result; and the final result stored in vector/scalar register Rd.

Operation

```
for (i = 0; i < NumElem && EMASK[i]; i++) {
    if (Ra[i] > 0)         extsgn3 = 1;
    else if (Ra[i] < 0)    extsgn3 = −1;
    else                   extsgn3 = 0;
    Rd[i] = Ra[i] + Rb[i]  − extsgn3;
}
```

Section A.3 VADDH: Add Two Adjacent Elements

Assembler Syntax
VADDH—VRd, VRa, VRb
VADDH—VRd, VRa, SRb

Description

For each element, add two adjacent pair of elements.

Operation

```
for (i = 0; i < NumElem − 1; i++) {
    Rd[i] = (Ra[i] + Ra[i + 1]);
}
Rd[NumElem − 1] = (Ra[NumElem − 1] + {VRb[0] || SRb});
```

Section A.4 VADDQ: Add Quad

Assembler Syntax
VADDQ—VRd, VRa, VRb

Description

Calculate the average of four elements, as shown in the FIG. 2(b). Note that the left most element ($D_{n-1}$) is undefined.

Operation

```
for (i = 0; i < NumElem − 1; i++) {
    Rd[i] = (Ra[i] + Rb[i] + Ra[i + 1] + Rb[i + 1]);
```

Section A.5 VAVGH: Average Two Adjacent Elements

Assembler Syntax
VAVGH—VRd, VRa, VRb
VAVGH—VRd, VRa, SRb

Description

For each element, average two adjacent pair of elements.

Operation

```
for (i = 0; i < NumElem − 1; i++) {
    Rd[i] = (Ra[i] + Ra[i + 1]) // 2;
}
Rd[NumElem − 1] = (Ra[NumElem − 1] + {VRb[0] || SRb}) //2;
```

Section A.6 VAVGQ: Average Quad

Assembler Syntax
VAVGQ—VRd, VRa, VRb

Description

Calculate the average of four elements, as shown in the FIG. 2(b). Note that the left most element ($D_{n-1}$) is undefined.

Operation

```
for (i = 0; < NumElem − 1; i++) {
    Rd[i] = (Ra[i] + Rb[i] + Ra[i + 1] + Rb[i + 1])//4;
```

Section A.7 VEXTSGN2: Extract Sign of (−1, 1)

Assembler Syntax
VEXTSGN2—VRd, VRa
VEXTSGN2—SRd, SRa

Description

Sign value of the content of vector/scalar register Ra elementwise is computed and the result is stored in vector/scalar register Rd.

Operation

```
for (i = 0; i < NumElem && EMASK[i]; i++) {
    Rd[i] = (Ra[i] < 0) ? −1: 1;
```

Section A.8 VEXTSGN3: Extract Sign of (−1, 0, 1)

Assembler Syntax
VEXTSGN3—VRd, VRa
VEXTSGN3—SRd, SRa

Description

Sign value of the content of vector/scalar register Ra elementwise is computed and the result is stored in vector/scalar register Rd.

Operation

```
for (i = 0; i < NumElem && EMASK[i]; i++) {
    if (Ra[i] > 0)       Rd[i] = 1;
    else if (Ra[i] < 0)  Rd[i] = −1;
    else                 Rd[i] = 0;
}
```

We claim:

1. A method for a processor to execute a single instruction, comprising steps of:

reading a first data element and a second data element from source operands of the instruction;

selecting a value from a set of predefined values, according to the sign of said first data element; and adding the first data element, the second data element, and the selected value to generate a third data element as a result of the instruction.

2. The method of claim 1, wherein:

(a) said source operands include a first scalar operand and a second scalar operand; and (b) the first data element and the second data element are respectively the first operand and the second operand.

3. The method of claim 2, wherein said set of predefined values are −1, 0 and 1.

4. The method of claim 3, wherein the selected value is:

(a) −1 if the sign of said first data element is negative;

(b) 0 if the sign of said first data element is zero; and (c) 1 if the sign of said first data element is positive.

5. The method of claim 3, wherein the selected value is:

(a) 1 if the sign of said first data element is negative;

(b) 0 if the sign of said first data element is zero; and (c) −1 if the sign of said first data element is positive.

6. The method of claim 1, wherein said source operands include a first vector operand and a second vector operand, and the method further comprises:

(a) reading a plurality of first vector elements from the first elements VRa[0] to VRa[N−1] from the first vector operand;

(b) reading a plurality of second vector elements from the second vector elements VRb[0] to VRb[N−1] from the second vector operand; and (c) for each value of an index i ranging from 0 to N−1, selecting a value SIGN[i] from the set of predefined values according to the sign of the first data element VRa[i], and adding VRa[i], VRb[i] and SIGN[i].

7. The method of claim 6, wherein said set of predefined values are −1, 0 and 1.

8. The method of claim 7, wherein the selected value SIGN[i], for each value of said index i ranging from 0 to N−1, is:

(a) −1 if the sign of said first data element VRa[i] is negative;

(b) 0 if the sign of said first data element VRa[i] is zero; and (c) 1 if the sign of said first data element VRa[i] is positive.

9. The method of claim 7, wherein the selected value SIGN[i], for each value of said index i ranging from 0 to N−1, is:

(a) 1 if the sign of said first data element VRa[i] is negative;

(b) 0 if the sign of said first data element VRa[i] is zero; and (c) −1 if the sign of said first data element VRa[i] is positive.

10. The method of claim 1, wherein the step of adding is executed within a single clock cycle.

* * * * *